(12) United States Patent
Cheng et al.

(10) Patent No.: US 11,691,906 B1
(45) Date of Patent: Jul. 4, 2023

(54) STABILIZED ELECTROMAGNETIC BASE LIQUID, FORMATION THEREOF AND APPLICATION TO HIGH-SALT WASTEWATER TREATMENT

(71) Applicant: Xiaoling Cheng, Nanjing (CN)

(72) Inventors: XiaoLing Cheng, Nanjing (CN); Mark A. Fitzgerald, St. Louis, MO (US)

(73) Assignee: XiaoLing Cheng, Nanjing (CN)

( * ) Notice: Subject to any disclaimer, the term of this patent is extended or adjusted under 35 U.S.C. 154(b) by 0 days.

(21) Appl. No.: 17/518,719

(22) Filed: Nov. 4, 2021

(51) Int. Cl.
*C02F 9/00* (2023.01)
*B01D 61/14* (2006.01)
(Continued)

(52) U.S. Cl.
CPC .............. *C02F 9/00* (2013.01); *B01D 9/0031* (2013.01); *B01D 61/027* (2013.01); *B01D 61/145* (2013.01); *B01D 61/58* (2013.01); *B01J 19/08* (2013.01); *B01D 2311/06* (2013.01); *B01D 2311/12* (2013.01); *B01D 2311/2638* (2013.01); *B01D 2311/2642* (2013.01); *B01D 2311/2649* (2013.01); *B01D 2311/2673* (2013.01); *B01D 2321/16* (2013.01); *B01J 2219/08* (2013.01); *B01J 2219/0894* (2013.01); *C02F 1/001* (2013.01); *C02F 1/048* (2013.01);
(Continued)

(58) Field of Classification Search
None
See application file for complete search history.

(56) References Cited

U.S. PATENT DOCUMENTS 3,042,606 A 7/1962 Salutsky et al.
8,475,757 B2 7/2013 Bublitz
(Continued)

FOREIGN PATENT DOCUMENTS

DE 102005040018 A1 3/2007

OTHER PUBLICATIONS

The solvation of two electrons in the gaseous clusters of Na—(NH3)n and Li—(NH3)n, Zhang, Han; Liu, Zhi-Feng, Journal of Chemical Physics (2012), 136 (12), 124314/1-124314/12.*
(Continued)

*Primary Examiner* — Wayne A Langel
(74) *Attorney, Agent, or Firm* — Grace J. Fishel

(57) ABSTRACT

The invention is about a stabilized electromagnetic base liquid, as well as its preparation method and its application in the high-salt wastewater treatment. The raw material components of the electromagnetic base fluid include: 20-30 parts of alkali metal hydroxides(e.g., as sodium hydroxide); 20-30 parts of non-alkali metal (e.g., as silicon or phosphorus); 2-6 parts of ammonia; 31-140 parts of water; after treatment with a direct electrical current the parameters of the stabilized electromagnetic base liquid are: pH value: 12 to 14; oxidation reduction potential value: −1.0 to −1.8 v; with no corrosivity, confirming the presence of stabilized hydrated electrons ($e_{aq^{--}}$). With the stabilized electromagnetic base liquid, the storage problem of the electromagnetic base liquid is solved, and the large-scale application in the industrial field can be realized, thereby achieving a large-scale high-salt wastewater treatment process with low cost, high recovery rate.

8 Claims, 2 Drawing Sheets

(51) Int. Cl.
*B01D 61/02* (2006.01)
*B01D 61/58* (2006.01)
*B01D 9/00* (2006.01)
*B01J 19/08* (2006.01)
*C02F 1/44* (2023.01)
*C02F 1/00* (2023.01)
*C02F 1/70* (2023.01)
*C02F 101/10* (2006.01)
*C02F 101/30* (2006.01)
*C02F 1/04* (2023.01)

(52) U.S. Cl.
CPC .............. *C02F 1/442* (2013.01); *C02F 1/444* (2013.01); *C02F 1/705* (2013.01); *C02F 2001/007* (2013.01); *C02F 2101/10* (2013.01); *C02F 2101/30* (2013.01); *C02F 2305/00* (2013.01)

(56) References Cited

U.S. PATENT DOCUMENTS

| | | |
|---|---|---|
| 10,603,636 B2 | 3/2020 | Bublitz |
| 2003/0205526 A1 | 11/2003 | Vuong |
| 2007/0102359 A1 | 5/2007 | Lombardi et al. |

OTHER PUBLICATIONS

English translation of DE 102005040018.

\* cited by examiner

STABILIZED ELECTROMAGNETIC BASE LIQUID, FORMATION THEREOF AND APPLICATION TO HIGH-SALT WASTEWATER TREATMENT

BACKGROUND OF THE INVENTION

Field of the Invention

The present invention relates to a stabilized electromagnetic base liquid and a preparation method and application in high-salt wastewater treatment.

Brief Description of the Prior Art

High-salt wastewater refers to a kind of typical industrial wastewater with a mass fraction of Total Dissolved Solids (TDS) greater than 3.5%, and the characters are as follows: large water volume, high inorganic salt ions ($K^+$, $Na^+$, $Ca^{++}$, $Mg^{++}$, $Cl^-$, $SO_4^{--}$, etc.) content, critical changes in water quality and quantity, difficult to biochemically degrade, etc.

At present, the treatment methods of high-salt liquid waste include the membrane pretreatment technology in the early stage and the incineration technology of the high-salt liquid waste in the later stage. The purpose of membrane pretreatment is to separate the high-salt waste liquid into the qualified reclaimed brine and membrane-rejected concentrated brine; then process the membrane-rejected by incineration, evaporative crystallization and evaporation pond treatment technology.

However, the current membrane pretreatment technology cannot ideally separate enough qualified reclaimed brine, namely a low output rate, while the membrane-rejected concentrated brine accounts for most of the total treated water volume, which leads to an excessive treatment volume for incineration, evaporation and crystallization of high-salt waste liquid in the later stage. Large investment, high cost, limited treatment capacity, and narrow application range become the bottlenecks of traditional treatment technology.

In addition, many other problems of the traditional technology exist. For example, the principle of multi-stage salt separation process combined with membrane pretreatment, nanofiltration technology, evaporation and concentration-cooling crystallization is as follows: separate the salt and water in the high-salt wastewater, apply the condensed water in industrial production, and centrally treat the crystallized salt. During the treatment, the scaling water ion after nanofiltration will be precipitated after membrane concentration or evaporation concentration and will adhere to the membrane or tube wall, forming hard scales that are difficult to fall off, which leads to the problem of high operating pressure in membrane treatment in practice and further increases the use cost and reduces the water output rate of membrane pretreatment. When scaling water ions block membranes, pipelines or devices, consumables replacement or equipment cleaning is necessary, which further increases the cost of use, and the replaced membrane also has the problem of reverse osmosis membrane pollution.

An electromagnetic base fluid may be suitable for wastewater treatment because it can decompose organic substances through reduction reactions. The so-called electromagnetic base fluid refers to the electrons that exist in the aqueous solution. In 1952, Stein et al. first proposed the concept of "electromagnetic base fluid ($e_{aq--}$)" and assumed it as an active substance necessary for liquid phase reaction. The exposed electrons surrounded by water clusters acquire very active chemical properties and are extremely strong reducing agents.

The methods of producing electromagnetic base liquid mainly include radiation exposure method and light irradiation method. The above methods generate OH groups that absorb electrons while generating electromagnetic base fluid. Therefore, in order to prevent the newly generated electromagnetic base fluid from being absorbed by the OH groups, hydrogen is often introduced into the reaction system, and the OH groups are captured by hydrogen to ensure the existence of the electromagnetic base fluid. The limitation of the above production methods is that the electromagnetic base fluid does not exist for a long time, so it can only be practically used in the laboratory. The mode of manufacturing electromagnetic base fluids for instant application after production is not suitable for wastewater treatment requirements in industrial applications, which greatly limits the industrial application of electromagnetic base fluids.

BRIEF SUMMARY OF THE INVENTION

In view of the above, it is an object of the present invention to provide a stabilized electromagnetic base fluid which can be stored and used in high-salt wastewater treatement, solving the problems of high cdost, large investment, critical treatment volume limiation and membrane pollution of the existing high-salt wastewater threatment method. Other objects and features of the invention will be in part apparent and in part pointed out hereinafter.

In accordance with the present invention a stabilized electromagnetic liquid comprises an exothermic reaction mixture of
  (i) 20-30 parts by weight ratio alkali metal hydroxide,
  (ii) 20-30 parts by weight ratio non-alkali metal,
  (iii) 2-6 parts by weight ratio ammonia, and
  (iv) 31-140 parts by weight ratio water
resulting in electromagnetic base liquid with hydrated electrons ($e_{aq--}$)
to which electromagnetic base liquid a direct current is applied to stabilize the hydrated electrons ($e_{aq--}$) resulting in a stabilized electromagnetic liquid with a pH value between 12 and 14, an oxidation reduction potential between about −1.0 and −1.8 v with substantially no corrosivity.

The stabilized electromagnetic base liquid is prepared as follows:

Step 1: as weight ratio, weigh and take 20-30 parts of alkali metal hydroxide and 20-30 parts of non-alkali metal; mix the alkali metal hydroxide and non-alkali metal uniformly to obtain the mixture;

Step 2: add a first part of ammonia water to the mixture for a reaction of 1-2 hours, obtaining the preliminary reaction mixture; as weight ratio, the first part of ammonia water is 1 to 2 parts of ammonia and 20 to 40 parts of water;

Step 3: when the temperature of preliminary reaction mixture reaches 110°, add a second part of ammonia water to the mixture for a reaction of 4-6 hours; control the reaction temperature between 110-160°, obtaining the complete reaction mixture; as weight ratio, the second part of ammonia water is 1 to 4 parts of ammonia and 10 to 40 parts of water;

Step 4: as weight ratio, add 1-60 parts of water to the complete reaction mixture for dilution, obtaining the diluted mixture;

Step 5: filter the diluted mixture and let it stand for 10-24 hours, obtaining the filtrate;

Step 6: apply a plasma generator with direct current to process the filtrate by the plasma jet generated in the discharge process to obtain an electromagnetic base liquid with following characters: a pH value between 12 and 14; oxidation reduction potential value between −1.0 and −1.8 v; with no corrosivity; and with stabilized hydrated electrons ($e_{aq-}$).

The stabilized electromagnetic liquid may be used to treat high-salt wastewater as follows:

Step 1: pump the wastewater into a wastewater container and perform a sand filtration and ultrafiltration for the removal of organic macromolecules and inorganic particles in the wastewater;

Step 2: pump the filtered wastewater into a sedimentation tank and add the electromagnetic base liquid into the wastewater for the removal of calcium and magnesium, obtaining a concentrated brine with electromagnetic base liquid;

Step 3: pump the concentrated brine into a nanofilter with a nanofiltration membrane pressure of 2.5 MPa for desalination to obtain reclaimed water and salts;

Step 4: place the salts in an evaporation tank and dry the salts with high-temperature incineration or evaporation crystallization; and, Step 5: recycle the reclaimed water.

The invention summarized above comprises the compositions and methods hereinafter described, the scope of the invention being indicated by the subjoined claims.

BRIEF DESCRIPTION OF THE SEVERAL VIEWS OF THE DRAWINGS

In the accompanying drawings corresponding reference characters refer to corresponding parts throughout the several views of the drawings in which.

DETAILED DESCRIPTION OF AT LEAST ONE PREFERRED EMBODIMENT OF THE INVENTION

Figure 1:
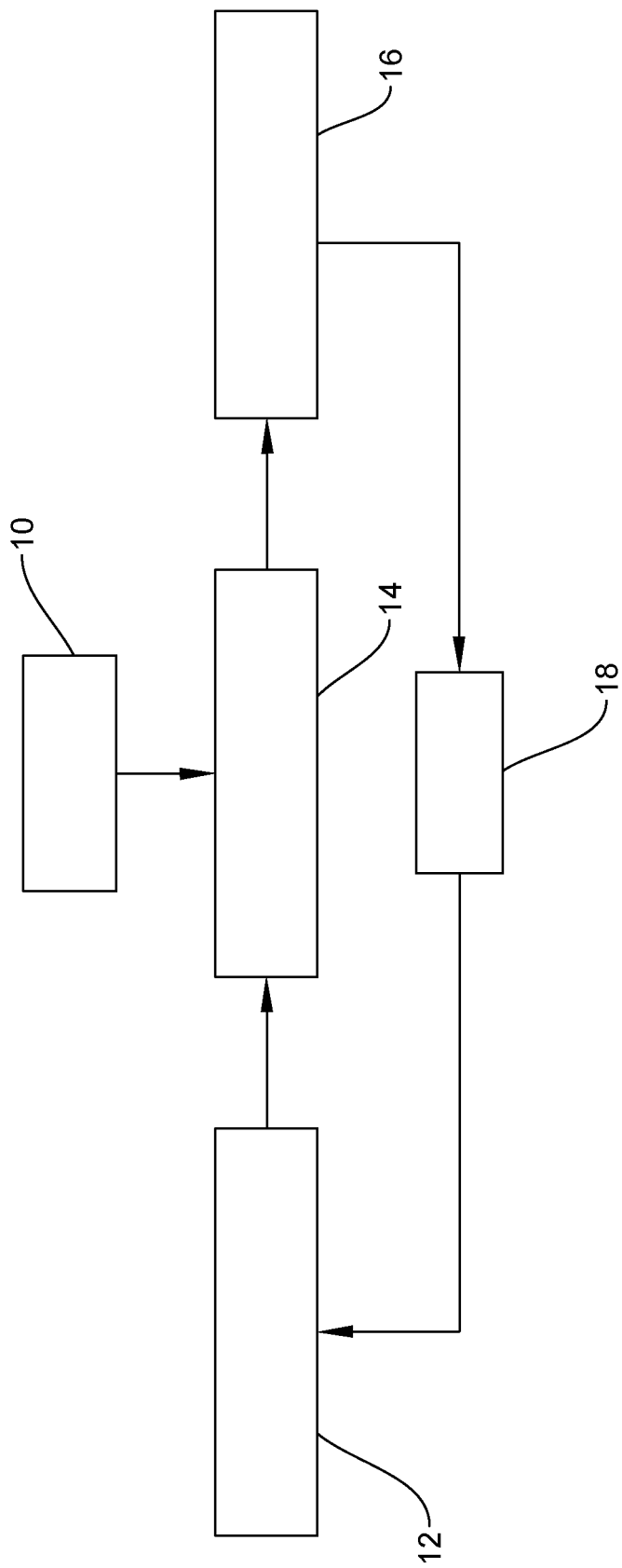
FIG. 1 is a process diagram of the DC discharge procedure in the preparation process of the stabilized electromagnetic base liquid of this invention.

In order to solve the above technical problem, the technical solution adopted by this invention is: a stabilized electromagnetic base liquid, the raw material component of which is an electromagnetic base fluid include (as weight ratio): 20-30 parts of alkali metal hydroxides; 20-30 parts of non-alkali metal; 2-6 parts of ammonia; 31-140 parts of water; parameters of the electromagnetic base liquid: pH value: between 12 and 14; oxidation reduction potential value between −1.0 and −1.8 v; with no corrosivity.

Optimized, the raw material components of the electromagnetic base fluid also include (as weight ratio): 0.08-1.2 parts of metal or other oxide materials as hypo-sodium chlorate catalyst. The metal catalyst accelerates the reaction speed, making the reaction faster and more complete.

Optimized, Fe—Ni or skeletal Ni is adopted as the metal catalyst.

Optimized, the non-alkali metal is silicon in either chaff or particle form.

A preparation method of the electromagnetic base liquid, including the following steps: Step 1: as weight ratio, weigh and take 20-30 parts of alkali metal hydroxide and 20-30 parts of non-alkali metal; mix the alkali metal hydroxide and non-alkali metal uniformly to obtain the mixture; Step 2: add the first part of ammonia water to the mixture for a reaction of 1-2 hours, obtaining the preliminary reaction mixture; as weight ratio, the first part of ammonia water is 1 to 2 parts of ammonia and 20 to 40 parts of water; Step 3: when the temperature of preliminary reaction mixture reaches 110° C., add the second part of ammonia water to the mixture for a reaction of 4-6 hours; control the reaction temperature between 110-160°, obtaining the complete reaction mixture; as weight ratio, the second part of ammonia water is 1 to 4 parts of ammonia and 10 to 40 parts of water; Step 4: as weight ratio, add 1-60 parts of water to the complete reaction mixture for dilution, obtaining the diluted mixture; Step 5: filter the diluted mixture and let it stand for 10-24 hours, obtaining the filtrate; Step 6: adopt the plasma generator with direct current to process the filtrate by the plasma jet generated in the discharge process to obtain the electromagnetic base liquid with following characters: pH value: 12-14; oxidation reduction potential value (ORP): −1.0- to −1.8 v; with no corrosivity.

Optimized, as weight ratio, 0.08-1.2 parts of metal catalyst is added in Step 2. The metal catalyst is added to further accelerate the reaction rate and promote the complete reaction.

Optimized, the molar ratio of alkali metal hydroxide and non-alkali metal is 1:0.5 to 1:10. This ratio is proportional to the effective surface area of the non-alkaline metal in the exothermic phase of the reaction. For example, when the non-alkali metal has a large surface area and a large amount of erosion in the exothermic phase, the ratio of the non-alkali metal to the alkali metal will be larger.

The electromagnetic base liquid described in Step 5 above contains hydrated electrons ($e_{aq-}$) but is not storable. The present invention of a storable electromagnetic base liquid through a creative method described in Step 6 and shown in FIG. 1.

Optimized, the direct current in Step 6 is 0 to 20 kV (adjustable); discharge current: 2 to 8 mA; discharge duration: 10 to 60 min.

Figure 2:
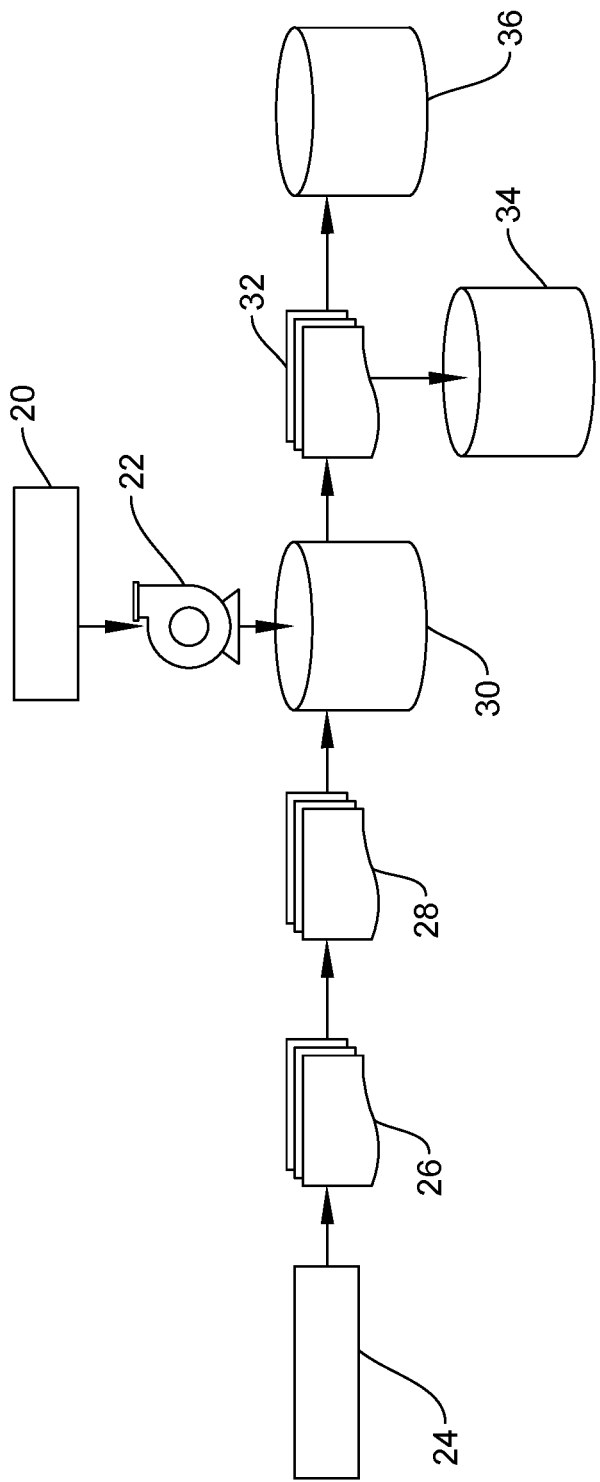
FIG. 2 is a schematic diagram of the high-salt wastewater treatment process of this invention.

The application of stabilized electromagnetic base liquid in the high-salt wastewater treatment, as shown in FIG. 2 includes the following steps:

Filtration: pump the wastewater into the wastewater container and perform the sand filtration and ultrafiltration for the removal of organic macromolecules and inorganic particles in the wastewater;

Sedimentation: pump the filtered wastewater into the sedimentation tank and add electromagnetic base liquid into the wastewater for the removal of calcium and magnesium, obtaining the concentrated brine with electromagnetic base liquid;

Nanofiltration: pump the concentrated brine into the nanofilter with a nanofiltration membrane pressure of 2.5 MPa for desalination, obtaining the reclaimed water and materials of completed salt by separation;

Evaporation: gather the materials of completed salt in the evaporation tank, and completely evaporate the materials of completed salt through high-temperature incineration;

Recycling: directly recycle the reclaimed water and the treatment is done. Since the electromagnetic base fluid is characterized by alkaline, non-corrosive, low ORP, and can polymerize a large amount of negative hydrogen, the application of electromagnetic base fluid in high-salt wastewater treatment acquire the following advantages: a. the electromagnetic base fluid has removed the calcium and magnesium elements in the wastewater, so that the nanofiltration membrane will not be blocked by the wastewater; b. a recovery rate above 80% can be obtained by the nanofiltration through a membrane with the pressure of 2.5 MPa, and the water quality of the reclaimed water can reach the reuse standard for reclaimed water; due to the negative electric repulsion effect of the nanofiltration membrane, the materials of completed salt in the highly concentrated brine added with the electromagnetic base liquid cannot pass through the nanofiltration system, which has a desalination effect and ensures the harmless treatment of wastewater; and c. the electromagnetic base fluid has a strong reducibility and does not contain any hydroxide, which has an anti-corrosion effect on the treatment equipment.

This invention has the following advantages: providing an stabilized electromagnetic base liquid that can be stored for a long time, and applying the stabilized base liquid to high-salt wastewater treatment in large volume, so as to solve the problems of high cost, large investment, critical treatment volume limitation, and membrane pollution of the existing high-salt wastewater treatment methods. High-salt wastewater treatment with the stabilized electromagnetic base liquid of this invention is with low cost, large treatment capacity but no secondary pollution, and can prolong the service life of the treatment equipment. The treatment effect is ideal, and the water output volume is large, which fully meets the current requirements of environmental protection and zero discharge.

The following examples illustrate the invention.

Example 1

A first stabilized electromagnetic base liquid was prepared as follows.

Add 400 g of silicon powder and 400 g of NaOH particles into an open reactor, obtaining 800 g of mixture after uniform mixing.

Add a first part of ammonia water (20 g of ammonia and 400 g of water) into the open reactor and stir, leaving for a time of one hour to obtain a preliminary reaction mixture.

When the preliminary reaction mixture bubbles and the temperature reaches 110° C., a second part of ammonia water (20 g of ammonia and 200 g of water) shall be added; control the reaction temperature not to exceed 160° C., and react for 4 hours to obtain the complete reaction mixture.

Add 20 g of distilled water to the complete reaction mixture for dilution, obtaining the diluted mixture.

Filter the diluted mixture to remove impurities, and the filtered liquid shall be allowed to stand for 10 hours to obtain the filtrate, which is stored in a electromagnetic base liquid pretreatment tank 12.

As shown in FIG. 1, a negative polarity voltage is applied to the tungsten steel electrode of a plasma discharge reactor 14 by a power supply 10 (DC, 20 kV, 50 mA), and a discharge plasma is generated between the electrode and the liquid surface. A circulating pump 18 pumps the liquid in the electromagnetic base liquid pretreatment tank 12 into the plasma discharge reactor 14 through the silicone tube. Apply a 2 mA discharge current for 10 minutes to obtain 1410 g gray-blue electromagnetic base liquid. The circulating pump 18 pumps the stabilized electromagnetic base liquid from the plasma discharge reactor 14 into a stabilized electromagnetic base liquid storage tank 16. The stabilized electromagnetic base fluid has the following properties: pH value: 14, ORP −1.0 v, no corrosivity.

Example 2

As shown in FIG. 2, a high-salt wastewater treatment with the stabilized electromagnetic base liquid was applied to industrial wastewater from the chemical park, with a TDS about 38000 mg/L.

Step 1: pump the 5 tons of concentrated brine wastewater into a wastewater container 24 and perform preliminary filtration, namely a sand filtration 26 and an ultrafiltration 28, for the removal of organic macromolecules and inorganic particles in the wastewater, obtaining the filtered wastewater.

Step 2: pump the filtered wastewater into a sedimentation tank 30 and add the stabilized electromagnetic base liquid 20 for reduction and precipitation reaction (400 g of stabilized electromagnetic base liquid for every ton of filtered wastewater). Due to the low ORP of the stabilized electromagnetic base liquid, it is possible to precipitate Ca2+, Mg2+ and other ions with more than two valences after being reduced by the stabilized electromagnetic base liquid.

Step 3: after filtering the sediment, pump the remaining concentrated brine containing stabilized electromagnetic base liquid into a nanofiltration filter 32 (membrane pressure: 2.5 MPa) for desalination process. The reaction between negative charge and aluminum forms materials of completed salt, but the negative electric repulsion effect of the nanofiltration membrane makes the materials of completed salt unable to pass through the nanofiltration membrane, achieving the desalination effect. The recovery rate of reclaimed water 36 is 87% and the TDS is 783 mg/L after the above filtration, which complies with the national standard, and the reclaimed water can be supplied for industries.

Step 4: incinerate or evaporate and crystallize the concentrated solution of materials of completed salt in evaporation pond 34.

Example 3

A second stabilized electromagnetic base liquid was prepared as follows:

Add 600 g of zinc particles and 600 g of potassium hydroxide particles into the open reactor, obtaining 1200 g of mixture after uniform mixing.

Add the first part of ammonia water (40 g of ammonia and 800 g of water) into the open reactor and stir, leaving for a react of one hour to obtain the preliminary reaction mixture. When the preliminary reaction mixture bubbles and the temperature reaches 110° C., the second part of ammonia water (80 g of ammonia and 800 g of water) shall be added; control the reaction temperature not to exceed 160° C., and react for 6 hours to obtain the complete reaction mixture.

Add 1200 g of distilled water to the complete reaction mixture for dilution, obtaining the diluted mixture.

Filter the diluted mixture to remove impurities, and the filtered liquid shall be allowed to stand for 24 hours to obtain the filtrate, which is stored in the electromagnetic base liquid pretreatment tank 12.

As shown in FIG. 1, a negative polarity voltage is applied to the tungsten steel electrode of the plasma discharge reactor 14 by the power supply 10 (DC, 20 kV, 50 mA), and a discharge plasma is generated between the electrode and the liquid surface. The circulating pump 18 pumps the liquid in the electromagnetic base liquid pretreatment tank 12 into the plasma discharge reactor 14 through the silicone tube. Apply an 8 mA discharge current for 60 minutes to obtain 4100 g gray-blue stabilized electromagnetic base liquid. The circulating pump 18 pumps the stabilized electromagnetic base liquid from the plasma discharge reactor 14 into the stabilized electromagnetic base liquid storage tank 16. Stabilized electromagnetic base fluid properties: pH value: 13, ORP −0.8 v, no corrosivity.

Example 4

A high-salt wastewater treatment with the stabilized electromagnetic base liquid was applied to industrial wastewater from the chemical park, with a TDS about 38000 mg/L.

Step 1: pump 5 tons of concentrated brine wastewater into the wastewater container 24 and perform preliminary filtration, namely the sand filtration 26 and ultrafiltration 28, for the removal of organic macromolecules and inorganic particles in the wastewater, obtaining the filtered wastewater.

Step 2: pump the filtered waste into the sedimentation tank 30 and add the stabilized electromagnetic base liquid for reduction and precipitation reaction (600 g of stabilized electromagnetic base liquid for every ton of filtered wastewater). Due to the low ORP of the stabilized electromagnetic base liquid, it is possible to precipitate $Ca^{++}$, $Mg^{++}$ and other ions with more than two valences after being reduced by the electromagnetic base liquid.

Step 3: after filtering the sediment, pump the remaining concentrated brine containing stabilized electromagnetic base liquid into the nanofiltration filter 32 (membrane pressure: 2.5 MPa) for desalination process. The reaction between negative charge and aluminum forms materials of completed salt, but the negative electric repulsion effect of the nanofiltration membrane makes the materials of completed salt unable to pass through the nanofiltration membrane, achieving the desalination effect. The recovery rate of reclaimed water is 84% and the TDS is 769 mg/L after the above filtration, which complies with the national standard, and the reclaimed water can be supplied for industries.

Example 5

A third stabilized electromagnetic base liquid may be prepared as follows:

Add 500 g of aluminum particles and 500 g of sodium hydroxide particles into the open reactor, and mix uniformly.

Add 627 g of ammonia water (containing 30 g of ammonia) and 24 g of skeletal Ni catalyst, stirring for 1.5 h. When the reaction mixture bubbles and the temperature reaches 110° C., add 250 g of ammonia water (containing 30 g of ammonia) again; control the reaction temperature not to exceed 160° C., and react for 5 hours, and add 596 g of distilled water for dilution. Filter the diluted mixture and let it stand for 17 hours to obtain the filtrate, which shall be stored in the electromagnetic base liquid pretreatment tank 12.

As shown in FIG. 1, a negative polarity voltage is applied to the tungsten steel electrode of the plasma discharge reactor 14 by the power supply 10 (DC, 20 kV, 50 mA), and a discharge plasma is generated between the electrode and the liquid surface. The circulating pump 18 pumps the liquid in the electromagnetic base liquid pretreatment tank 12 into the plasma discharge reactor 14 through the silicone tube. Apply a 6 mA discharge current for 45 minutes to obtain 2300 g of stabilized electromagnetic base liquid. The circulating pump 18 pumps the stabilized electromagnetic base liquid from the plasma discharge reactor 14 into the stabilized electromagnetic base liquid storage tank 12. Stabilized electromagnetic base fluid properties: pH value: 13, ORP −0.9 v, no corrosivity.

Example 6

As shown in FIG. 2, the high-salt wastewater treatment with the stabilized electromagnetic base liquid may be applied to concentrated brine industrial wastewater from a chemical park, with a TDS about 38000 mg/L.

Step 1: pump 5 tons of concentrated brine wastewater into the wastewater container 24 and perform preliminary filtration, namely the sand filtration 26 and ultrafiltration 28, for the removal of organic macromolecules and inorganic particles in the wastewater, obtaining 5 tons of filtered wastewater.

Step 2: pump the filtered waste into the sedimentation tank 30 and add the stabilized electromagnetic base liquid for reduction and precipitation reaction (500 g of stabilized electromagnetic base liquid for every ton of filtered wastewater). Due to the low ORP of the stabilized electromagnetic base liquid, it is possible to precipitate $Ca^{++}$, $Mg^{++}$ and other ions with more than two valences after being reduced by the stabilized electromagnetic base liquid.

Step 3: after filtering the sediment, pump the remaining concentrated brine containing stabilized electromagnetic base liquid into the nanofiltration filter 32 (membrane pressure: 2.5 MPa) for desalination process. The reaction between negative charge and aluminum forms materials of completed salt, but the negative electric repulsion effect of the nanofiltration membrane makes the materials of completed salt unable to pass through the nanofiltration membrane, achieving the desalination effect. The recovery rate of reclaimed water is 85% and the TDS is 781 mg/L after the above filtration, which complies with the national standard, and the reclaimed water can be supplied for industries.

Step 4: gather the materials of completed salt in the evaporation pond 32, and completely evaporate the materials of completed salt through high-temperature incineration.

Example 7

A fourth stabilized electromagnetic base liquid may be prepared as follows:

Add 589 g of aluminum chaff and 420 g of lithium hydroxide particles into the open reactor, and mix uniformly.

Add 800 g of ammonia water (containing 40 g of ammonia) and 1.6 g of Fe—Ni catalyst into the open reactor, stirring for 55 min and leave for a reaction of 80 min. When the reaction mixture bubbles and the temperature reaches 110° C., add 780 g of ammonia water (containing 80 g of ammonia) again; control the reaction temperature not to exceed 160° C., and react for 5 hours, and add 800 g of distilled water for dilution. Filter the diluted mixture and let it stand for 20 hours to obtain the filtrate, which shall be stored in the electromagnetic base liquid pretreatment tank 12.

As shown in FIG. 1, a negative polarity voltage is applied to the tungsten steel electrode of the plasma discharge reactor 14 by the power supply 10 (DC, 20 kV, 50 mA), and a discharge plasma is generated between the electrode and the liquid surface. The circulating pump 18 pumps the liquid in the electromagnetic base liquid pretreatment tank 12 into the plasma discharge reactor 14 through the silicone tube. Apply a discharge current for 60 minutes to obtain 3340 g gray-blue electromagnetic base liquid. The circulating pump 18 pumps the stabilized electromagnetic base liquid from the plasma discharge reactor 14 into the stabilized electromagnetic base liquid storage tank 16. Stabilized electromagnetic base fluid properties: pH value: 12, ORP: −0.6 v, no corrosivity.

Example 8

As shown in FIG. 2, the high-salt wastewater treatment with the stabilized electromagnetic base liquid may be applied to industrial wastewater from the chemical park, with a TDS about 38000 mg/L.

Step 1: pump 5 tons of concentrated brine wastewater into the wastewater container 24 and perform preliminary filtration, namely the sand filtration 26 and ultrafiltration 28, for the removal of organic macromolecules and inorganic particles in the wastewater, obtaining 5 tons of filtered wastewater.

Step 2: pump the filtered waste into the sedimentation tank 30 and add the stabilized electromagnetic base liquid for reduction and precipitation reaction (800 g of electromagnetic base liquid for every ton of filtered wastewater). Due to the low ORP of the electromagnetic base liquid, it is possible to precipitate $Ca^{++}$, $Mg^{++}$ and other ions with more than two valences after being reduced by the electromagnetic base liquid.

Step 3: after filtering the sediment, pump the remaining concentrated brine containing stabilized electromagnetic base liquid into the nanofiltration filter 32 (membrane pressure: 2.5 MPa) for desalination process. The reaction between negative charge and aluminum forms materials of completed salt, but the negative electric repulsion effect of the nanofiltration membrane makes the materials of completed salt unable to pass through the nanofiltration membrane 32, achieving the desalination effect. The recovery rate of reclaimed water is 82% and the TDS is 803 mg/L after the above filtration, which complies with the national standard, and the reclaimed water 36 can be supplied for industries.

Step 4: gather the materials of completed salt in the evaporation pond 34, and completely evaporate the materials of completed salt through high-temperature incineration.

Example 9

A sample of the stabilized electromagnetic base liquid produced in example 1 was sent for analysis as to corrosiveness in accordance with ASTM D130. As received the liquid had a pH of 12.3 per ASTM E-70.

In the test a polished copper strip was immersed in the stabilized electromagnetic base liquid and held at a temperature of 100° C. for 3 hours. At the end of the heating period, the copper strip was removed, washed and the color and tarnish level assessed against the ASTM Copper Strip Corrosion Standard.

The strips had a slight tarnish, light orange, and were graded 1A, confirming that the stabilized electromagnetic base liquid had very low corrosiveness despite its high pH. These anomalous results indicate the absence of $OH^-$ ions and the confirm presence of stabilized hydrated electrons $(e_{aq--})$.

In summary as shown in the above examples 2, 4, 6 and 8, the recovery rate of the reclaimed water of this invention is above 80% of the total treated wastewater, and the reclaimed water meets the national standard and can be directly recycled. The quality of materials of completed salt that need to be evaporated is limited. In the prior art, the average service life of a nanofiltration membrane is about three years, while that of this invention is more than three times that of the prior art. The stabilized electromagnetic base liquid required for processing one ton of wastewater is 400 g-800 g, and the cost is about RMB 6, which is far lower than the processing cost of the prior art (RMB 13).

In view of the above, it will be seen that the several objects of the invention are achieved and other advantageous results attained. As various changes could be made in the above compositions and methods without departing from the scope of the invention, it is intended that all matter contained in the above description or shown in the accompanying drawings shall be interpreted as illustrative and not in a limiting sense.

What is claimed:

1. A stabilized electromagnetic base liquid having a pH value between 12 and 14, an oxidation reduction potential between about −1.0 and −1.8 v comprising a exothermic reaction mixture of
    (i) 20-30 parts by weight ratio alkali metal hydroxide,
    (ii) 20-30 parts by weight ratio non-alkali metal,
    (iii) 2-6 parts by weight ratio ammonia, and
    (iv) 31-140 parts by weight ratio water resulting in electromagnetic base liquid with hydrated electrons $(e_{aq-})$
        to which reaction mixture a direct current is applied to stabilize the hydrated electrons $(e_{aq-})$ and the electromagnetic base liquid.

2. The stabilized electromagnetic base liquid of claim 1 wherein the exothermic reaction mixture contains between about 0.08 and 1.2 parts by weight ratio of a metal catalyst.

3. The stabilized electromagnetic base liquid of claim 1 wherein the non-alkali metal is silicon, phosphorus and a combination of silicon and phosphorus and wherein the alkali metal is sodium hydroxide or potassium hydroxide.

4. A high-salt wastewater treatment with the stabilized electromagnetic base liquid of claim 1 comprising the following steps:
    Step 1: pump the wastewater into a wastewater container and perform a sand filtration and ultrafiltration for the removal of organic macromolecules and inorganic particles in the wastewater;
    Step 2: pump the filtered wastewater into a sedimentation tank and add the stabilized electromagnetic base liquid into the wastewater for the removal of calcium and magnesium, obtaining a concentrated brine with electromagnetic base liquid;
    Step 3: pump the concentrated brine into a nanofilter with a nanofiltration membrane pressure of 2.5 MPa for desalination to obtain reclaimed water and salts;
    Step 4: place the salts in an evaporation tank and dry the salts with high-temperature incineration or evaporation crystallization; and,
    Step 5: recycle the reclaimed water.

5. A method for preparing a stabilized electromagnetic base liquid comprising the following steps:
    Step 1: as weight ratio, weigh and take 20-30 parts of alkali metal hydroxide and 20-30 parts of non-alkali metal; mix the alkali metal hydroxide and non-alkali metal uniformly to obtain the mixture;
    Step 2: add a first part of ammonia water to the mixture for a reaction of 1-2 hours, obtaining the preliminary reaction mixture; as weight ratio, the first part of ammonia water is 1 to 2 parts of ammonia and 20 to 40 parts of water;
    Step 3: when the temperature of preliminary reaction mixture reaches 110°, add a second part of ammonia water to the mixture for a reaction of 4-6 hours; control the reaction temperature between 110-160°, obtaining the complete reaction mixture; as weight ratio, the second part of ammonia water is 1 to 4 parts of ammonia and 10 to 40 parts of water;
    Step 4: as weight ratio, add 1-60 parts of water to the complete reaction mixture for dilution, obtaining the diluted mixture;
    Step 5: filter the diluted mixture and let it stand for 10-24 hours, obtaining the filtrate;

Step 6: apply a plasma generator with direct current to process the filtrate by the plasma jet generated in the discharge process to obtain a electromagnetic base liquid with following characters: a pH value between 12 and 14; oxidation reduction potential value between −1.0 and −1.8 v; with no corrosivity; and with stabilized hydrated electrons ($e_{aq--}$).

6. The method of claim 5 wherein as weight ratio, 0.08-1.2 parts of sodium metal catalyst is added in Step 2.

7. The method of claim 5 wherein the molar ratio of alkali metal hydroxide and non-alkali metal is between 1:0.5 and 1:10 in Step 1.

8. The method of claim 5 wherein the direct current in Step 6 is between 0 and 20 kV; discharge current is between 2 and 8 mA; discharge duration is between 10 and 60 min.

* * * * *